(12) United States Patent
Drost et al.

(10) Patent No.: US 6,515,724 B1
(45) Date of Patent: Feb. 4, 2003

(54) OPTICAL SWITCH

(75) Inventors: Wolf-Gernot Drost; Klaus Berndt; Andreas Berger, all of Halle (DE)

(73) Assignee: F.O.B. GmbH Gesellschaft zur Fertigung Farbiger Optoelektronischer Bauelemente, Gröbers (DE)

( * ) Notice: Subject to any disclaimer, the term of this patent is extended or adjusted under 35 U.S.C. 154(b) by 0 days.

(21) Appl. No.: 09/622,619

(22) PCT Filed: Feb. 18, 1999

(86) PCT No.: PCT/DE99/00454

§ 371 (c)(1),
(2), (4) Date: Sep. 25, 2000

(87) PCT Pub. No.: WO99/42896

PCT Pub. Date: Aug. 26, 1999

(30) Foreign Application Priority Data

Feb. 20, 1998 (DE) .......................................... 198 07 121

(51) Int. Cl.⁷ ............................................. G02F 1/1325
(52) U.S. Cl. ........................ 349/106; 349/107; 349/158; 349/160
(58) Field of Search ................................. 349/106, 107, 349/158, 160

*Primary Examiner*—James Dudek
(74) *Attorney, Agent, or Firm*—Collard & Roe, P.C.

(57) ABSTRACT

The invention generally relates to an optical switch which in particular, is able to present a high-resolution color display. The aim of the invention is to produce an optical switch which has a simpler design than known constructive solutions and has a high degree of luminous efficiency and low parallax. The optical switch should also be guaranteed to function at approx. 550° C. The inventive e.g., LCD-type optical switch is characterized in that at least one of the support plates consists of color-structured dichroic polarization glass which is impressed with dichroic color filters, in that the dichroic color filters are situated within an orthogonal matrix in color filter layers and in that the color filter layers of the support plate, starting form the surface of the support plate, extend into the same to a depth of a few μm. Once the glass support plates have been structured, the color patterns remain stable to approx. 550° C. As a result of using the color-structured dichroic polarization filter, the invention requires at least one less polarization filter than conventional LCD's and therefore has a simpler construction.

6 Claims, 4 Drawing Sheets

Figure 1:
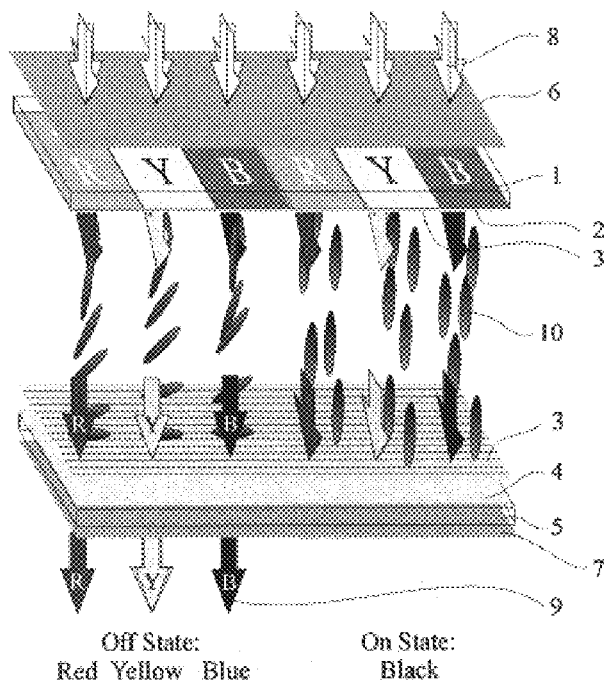

Off State:          On State:
Red Yellow Blue     Black

Off State:          On State:
Red Yellow Blue     White

Off State:　　　On State:
Red Yellow Blue　White

Off State:　　　On State:
Colored　　　　Colorless

Off State: Red Green Blue    On State: White

Off State:
Nearly no intensity in the specified ranges of UVA

On State:
Less than 50% reduction in the specified ranges of UVA

Off State: No transmission   On State: Approx. 50% transmission

Off State: No transmission   On State: Approx. 50% transmission

OPTICAL SWITCH

In general terms, the invention concerns an optical switch, which in particular can represent a high-resolution colour display. With its colour and polarisation effects, the optical switch is not limited to the visible spectral range. There is also the possibility of light-intensity control in the UV and IR ranges as well as combinations with applications in the visible spectral range.

Liquid crystal displays (LCDs) have long since been state of the art. They are distinguished by a low power demand and robust construction. For articles of daily use liquid crystal displays are used in a big way, being based on the principle that a twisted layer of liquid crystal rotates the polarisation level of light at different strengths according to whether an electrical field is fed or not. The light can then pass through a second polarisation filter in one case and not in the other.

Such a component consists of two glass plates, the support plates, between which the liquid crystal substance is situated. Both glass plates support conductive, transparent electrodes and orientation layers on the inside. When no electrical field is active, the liquid crystal molecules are oriented parallel to the glass plates. On the inside both glass plates support microfine arrangements, which are twisted towards each other (usually by 90° or 270°). Because the liquid crystal molecules align themselves to the arrangements of the orientation layer, a twisting of the molecules towards each other takes place in the liquid crystal layer. If an electrical current is fed between opposing electrodes, this causes an alignment of the molecules in the field direction; the polarisation direction of a penetrating beam of light is no longer rotated.

The structure of a liquid crystal display usually includes two polarisation filters in addition to other components. Each of these filters is aligned on the external surfaces of the support plates, and additional colour filters for colour LCDs. Made up of many layers, conventional LCDs have a very complicated structure. The colour filters are sensitive to high temperatures as they frequently consist of organic polymer material. The light yields in conventional colour LCDs are relatively small in general.

In accordance with DE 42 01 281 A1, a proposal is being made for the formation of substrate plates for liquid crystal displays suited to the colour reproduction of images. This publication sets out the fact that It is usual with substrate plates for liquid crystal displays, the control of which is carried out by means of a dot-matrix electrode structure and which allow colour images, to form the colour pixels of the various primary colours directly onto a support plate. However, as the colour pixels do not form any plain surface contours, they are fitted with a covering layer. The aim is to achieve a further development in this direction in accordance with DE 42 01 281 A1, whereby the colour filter layer formed from colour pixels is covered with an ultra-thin film or layer of glass. This measure is considered necessary if substrate plates are used in displays, which have angles of twist between the liquid crystal molecules of □ 90° or which only permit a small distance between the cell plates. As a result of the plain surface, now achieved with the aid of the covering, the aim is to bring about a uniform switching behaviour of the liquid crystal molecules. This example of the state of the art shows what efforts are necessary to produce high-calibre colour displays.

According to WO 94/20879, there is proposed a liquid crystal display, constructed with two support plates made of glass. A liquid crystal substance is located between the support plates. The support plates are provided with transparent electrodes, and polarizers are placed on the outer sides of the support carriers.

Color-structured dichroic filters are arranged on at least one of the support plates, which filters lie within a matrix in the sense of color filter layers and are supported by the support plate or support plates.

Now reference is made to a DE patent application with the reference number 196 42 116.0-33: This patent application, with the title "Process for structured energy transmission with electron beams", concerns a process by which energy is transmitted with the electron beam for a short time into limited surface elements onto preferably plain surfaces of objects—such as plates or tapes made of metallic, semi-conductive or dielectric materials or a combination of them. The useable machining effects are determined by the physical or chemical reaction of the materials to the energy transmission with the electron beam. The preferred area of application is the structuring of surfaces on strip-shaped objects of any length with a limited number of recurring structural elements aligned like a matrix in columns and rows. The essential inventive characteristic of the aforementioned patent application consists in the fact that the object to be machined is moved during the energy transmission contactlessly under a mask, in such a way that an electron beam is guided in the object's direction of movement oscillating at high frequency approximately vertical to the object's direction of movement over the recesses in the mask at a very high speed in relation to the object's movement.

One advantageous area of application is the highly productive structured machining of objects with relatively large surface areas. In the area of thermal electron beam machining the process can be used among other things for the colour structuring of suitably sensitised glass surfaces. For example, in this way a substrate made from glass with a specially prepared thin surface layer can be fitted by electron beam machining with a colour pattern in a repeated structure, as is common in LCD technology for instance. In order to achieve the desired optical effect, four pixels, aligned in an orthogonal matrix in each case, are to be subjected to varying energy densities. During machining a thermal effect causes the thin, prepared surface layer in the areas of the pixels to run through simultaneous temperature cycles, but with different maximum temperatures, in order to obtain certain optical properties pixel by pixel.

With the process in accordance with patent application 196 42 116.0-33, the limits of known processes for energy transmission with electron beams for machining materials have been overcome for the first time. It is now possible to subject structural elements as well as the smallest surface areas, e.g. pixels, to the electron beam defined in a particular alignment on the surface, in order to achieve certain machining effects in this area.

It is the task of the invention to propose an optical switch, which in comparison with known construction solutions has a simplified structure, in which a high light yield and a low parallax is given. The aim is that the optical switch should have a relatively low sensitivity to the effects of temperature as a direct consequence of the solution according to the invention. As has already been stated, the "Process for structured energy transmission with electron beams", in accordance with patent application DE 196 42 116.0-33, is currently the latest state of the art. Another task of the patent application submitted here is to use special components, structured according to the process in accordance with DE 196 42 116.0-33, corresponding to the patent application submitted here.

In accordance with the invention, the task is solved as set out in the following, whereby reference is made to patent application 1 regarding the fundamental inventive idea. The other advantageous features result from patent applications 2 to 6.

Further observations are necessary on the solution according to the invention. The support plates of the optical switch, which in particular represents a high-resolution display, consist of glass, into which dichroic colour filters are impressed. These are support plates which were structured according to the process in accordance with DE 196 42 116.0-23. The support plates can have a design that is either plain or not plain. For the structure of the optical switch only one or all support plates, as will be set out, can consist of glass, into which dichroic colour filters are impressed.

The dichroic colour filter layers of the support plates are generally aligned one-sided on the support plates. In the case of special applications the dichroic colour filter layers are to be aligned double-sided on the support plates.

With double-sided dichroic colour filter layers similar or different absorption and polarisation effects can be achieved.

Each of the dichroic colour filter layers in the support plates can be monochrome (monochrome display) or colour structured (polychrome display).

The dichroic colour filter layers are situated inside the glass matrix of the support plates, and they have a matrix-like distribution in accordance with the manufacturing process. The colour patterns in these cases have recurring structures and allow the structure of a display capable of full colour.

The dichroic colour filter layers of the support plates range from the glass surface into a depth of a few $\mu$m. To give an indication, depths of max. 10 $\mu$m here can be stated. The thickness of the colour zone can here also be only a few tenths of a $\mu$m.

The dichroic colour filters have colour and polarisation effects in the visible and/or invisible spectral range (UV, IR range).

To achieve low parallaxes, the structured colour filter layers of the support plates in an advantageous design are aligned on the side which is in contact with the liquid crystal substance, i.e. to achieve the smallest possible distance of the structured surfaces, these surfaces are situated on the inside. In principle, known alignments are being used here, whereby, unlike the known state of the art, the structured support plates in accordance with the process according to DE 196 42 116.0-33 are used.

If the lowest possible parallax is not deemed important, one or both of the colour filters can be situated on the external sides of the support plates, as is the case in principle with the known arrangements and filter structures.

It is essential to emphasise that the colour patterns according to the structuring of the support plates, insofar as they consist of glass, remain stable up to approx. 550° C./600° C. Other materials should by no means be ruled out here.

As will be explained, transmissive, reflective and transflective structures are possible.

The optical switches (e.g. of the LCD type), to be realised by using dichroically structured support plates, are distinguished by a simplified structure, where in many instances at least one polarisation filter is no longer necessary. The colour filters, dichroically structured, are situated in a layer, obviating the need for additional work with regard to compensating the level of the pixels. The filters are distinguished by a high light yield, as the dichroic filters have a lower basic absorption compared to conventional colour filters.

Some design examples shall explain the invention further.

The figures depict:

FIG. 1—transmissive colour LCD with the colour combination (red, yellow, blue; black)

Figure 2:
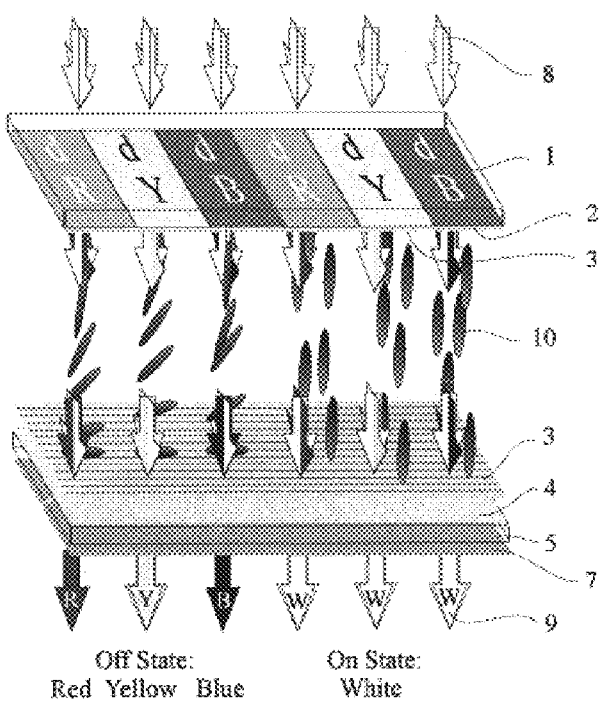

FIG. 2—transmissive colour LCD with the colour combination (red, yellow, blue; white)

Figure 3:
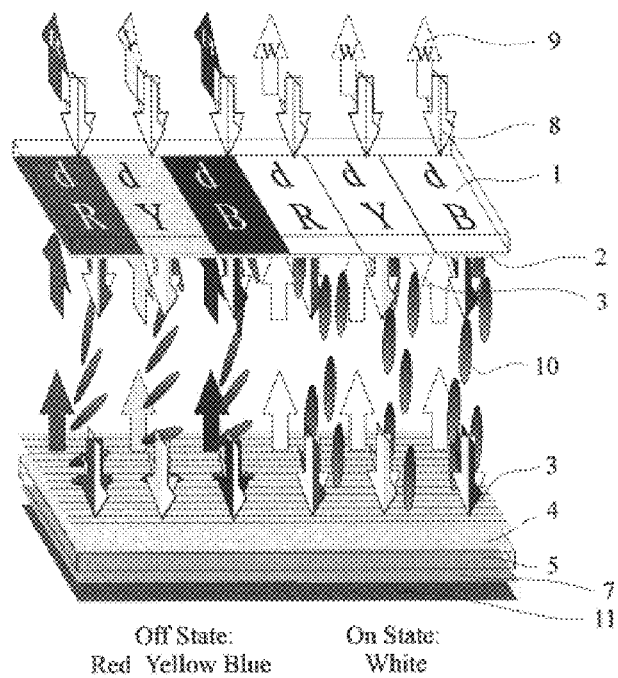

FIG. 3—reflective colour LCD with the colour combination (red, yellow, blue; white)

Figure 4:
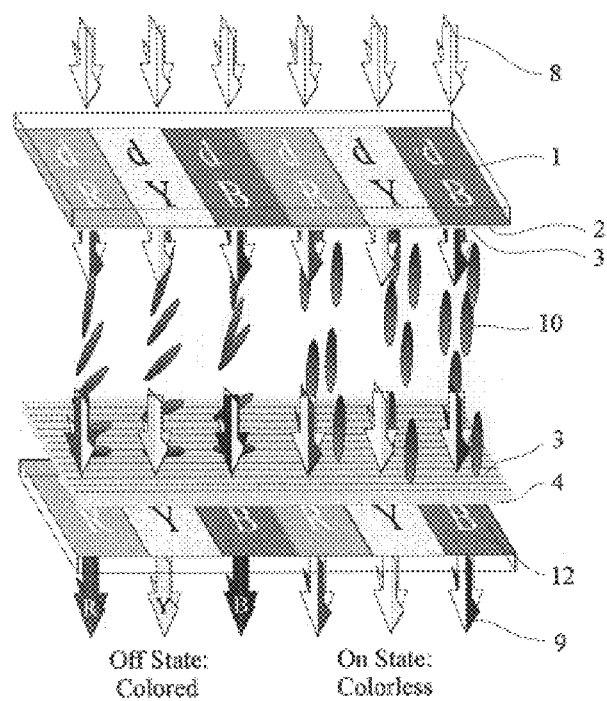

FIG. 4—transmissive colour LCD with the colour combination (red, yellow, blue)

Figure 5:
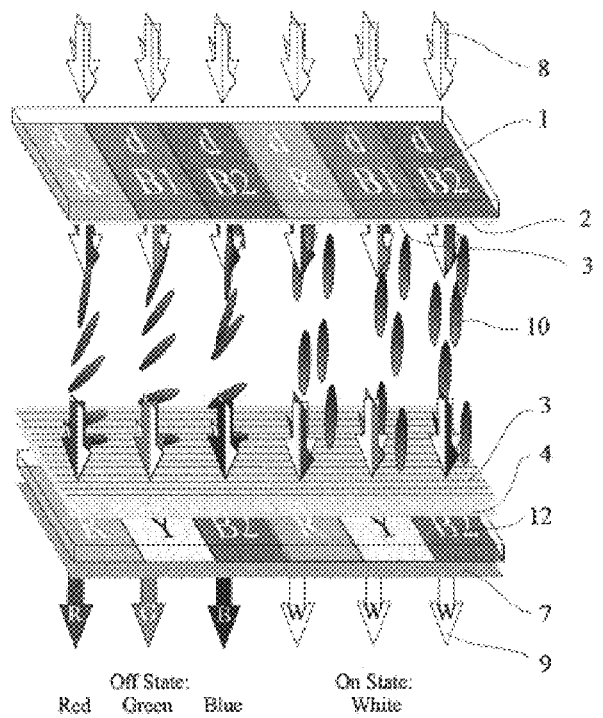

FIG. 5—transmissive colour LCD with the colour combination (red, green, blue; white)

Figure 6:
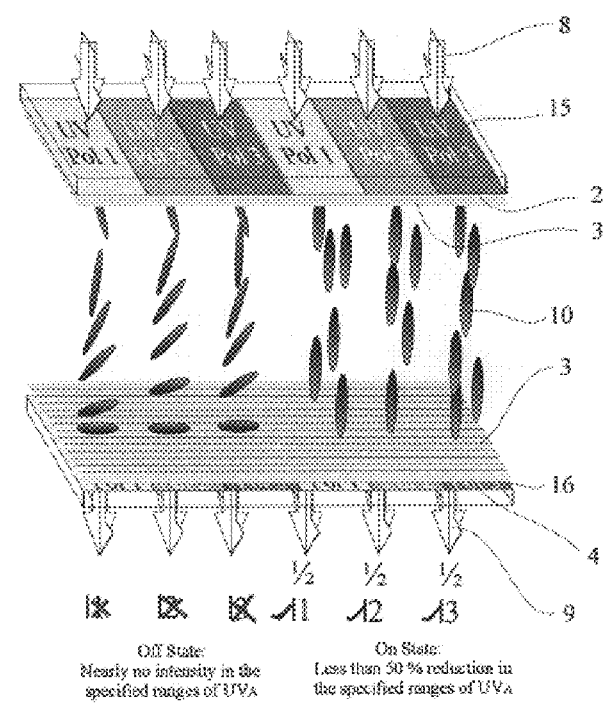

FIG. 6—optical switch for UV-A light (transmissive, extinction in narrow ranges)

Figure 7:
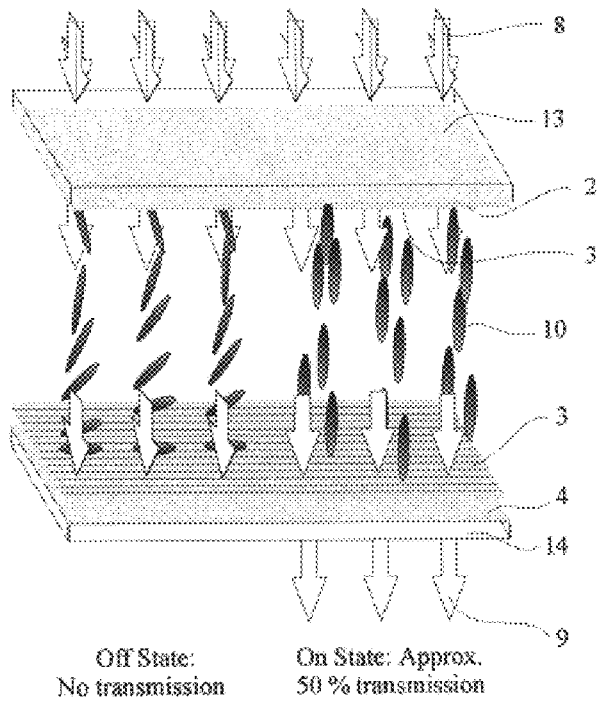

FIG. 7—optical switch for narrow-band UV-A light (transmissive)

Figure 8:
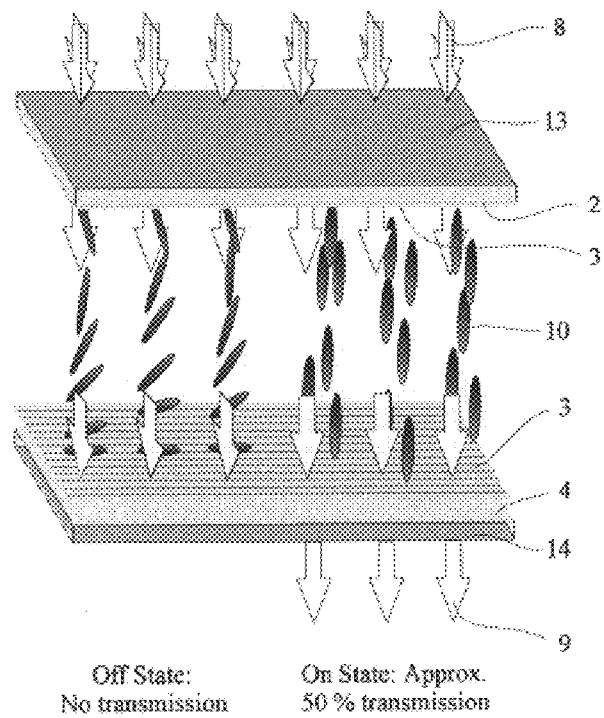

FIG. 8—optical switch for broad-band UV-A light (transmissive)

The reference marks used denote:

1—colour-structured dichroic glass
2—transparent segment electrodes
3—orientation level
4—transparent main electrode
5—glass support
6—front polariser
7—polarisation filter
8—incident light
9—outcoming light —to the observer
10—liquid crystal molecules
11—reflector
12—colour-structured dichroic glass
13—dichroic UV front polarisation glass
14—dichroic UV glass
15—dichroic colour-structured UV glass
16—dichroic colour-structured UV glass
dR—dichroic red
dG—dichroic yellow
dB—dichroic blue
R—red
G—yellow
B—blue
W—white
UV Pol 1—UV polarisation glass
UV Pol 2—UV polarisation glass
UV Pol 3—UV polarisation glass
$\lambda1, \lambda2, \lambda3$—outcoming UV-A light of varying wavelength The transmissive colour LCD with the colour combination according to FIG. 1 consists of a colour-structured dichroic glass 1. The optically active layer is one-sided and aligned on the inside. This layer was manufactured, according to the process stated before in the description, for structured energy transmission with electron beams, with the glass having dichroic red dR, dichroic yellow dG, dichroic blue dB. On the colour-structured dichroic glass 1 there are transparent segment electrodes 2 and the first orientation layer 3 on the inside. On a second glass support (with the reference mark 5) a transparent main electrode 4 and also a second orientation layer 3 (rotated 90° to the first) are aligned inside. Beneath the glass support 5 there is (on the outside) a polarisation filter 7, and above the colour-structured dichroic polarisation glass 1 (also outside) a front polariser 6 is located. Both polarisation filters are aligned twisted 90° to each other.

The incident unpolarised light 8 comes through the front polariser 6, being polarised in a linear manner. It comes through the colour-structured dichroic glass 1, where absorption in narrow wavelength ranges takes place, then through the liquid crystal layer, in which it is rotated by 90° in its polarisation direction when the current is not fed (i.e. In a non-triggered state), through glass support 5 with polarisation filter 7. As a result of the orientation of the polarisation filter 7 there is no absorption. From the polarisation filter 7 comes light 9, polarised in a linear manner, with the components red, yellow, blue.

In the triggered state an alignment of the liquid crystal molecules in the field direction takes place, the polarisation direction of the light is no longer rotated. The light is fully absorbed in the polarisation filter 7 (in all wavelength ranges of the visible spectrum), the triggered segments appear black.

According to FIG. 2 the incident light 8 (unpolarised) directly penetrates the colour-structured dichroic glass 1. One component of the electrical field vector remains virtually unaffected, while in the second, rotated by 90°, absorption in narrow wavelength ranges takes place. After leaving the colour-structured dichroic glass 1, white light (in a polarisation plane) is obtained with the colour components red, yellow, blue (in the polarisation plane rotated by 90° to the first). There is no front polariser.

In the non-triggered state the polarisation direction is rotated by 90°. After passing through the polarisation filter 7 (that is oriented in such a way that it completely absorbs the white component, and lets through the coloured component rotated by 90° virtually unweakened), this light only has the colour components red, yellow, blue and is polarised in a linear manner.

In the triggered state there is no rotation of the polarisation direction of the light, so that the colour component is absorbed by the polarisation filter 7, and the white component rotated by 90° can pass through. The outcoming light is white and polarised in a linear manner (see reference mark 9 in FIG. 2).

FIG. 3 shows the structure of a reflective colour LCD with colour combination, with a reflector 11 fitted outside on the polarisation filter 7 (rear polariser). As far as absorption and colour combination are concerned, the same effects occur, as shown in FIG. 2. It is merely the reflector 11, as an additional component, that causes the reflection of the light when it comes out of the polarisation filter 7.

The optically active layers are one-sided and aligned internally in FIG. 2 and FIG. 3, as well as in FIG. 1.

In comparison to FIGS. 1, 2 and 3, FIG. 4 has a change. Colour-structured dichroic glasses (1), (12) are aligned here on both sides of the liquid crystal layer (optically active layers on the inside, i.e. on the side in contact with the liquid crystal substance). In the triggered state, polarised white light comes in a partially linear manner from the glass with colour components in the polarisation direction rotated by 90°. This out-coming light (see reference mark 9—outcoming light) is perceived by the observer as slightly coloured. In the non-triggered state, the outcoming light is fully coloured and unpolarised.

In FIG. 5 the colour-structured dichroic glass 1, in contrast to FIG. 4, has the colour sequence red, blue 1, blue 2, while the colour-structured glass 12 has the colour sequence red, yellow, blue. Through the overlapping of blue and yellow in the path of the beam, green is produced. With the use of a polarisation filter 7 (rear polariser), it is possible to switch between the states of colour (red, green, blue) and white.

In FIG. 6 an optical switch for UV-A light (transmissive) is represented.

The incident light 8 (UV-A light, unpolarised) passes through the colour-structured, dichroic UV glass 15 (with the optically active layer one-sided and on the inside), further through the liquid crystal layer and finally through a colour-structured dichroic UV glass 16. Both glasses (according to reference marks 15, 16) have an optically active layer that is one-sided and on the inside. In the triggered state there is a maximum of 50% extinction. In the non-triggered state, extinction is almost total in the UV wavelength ranges indicated.

FIG. 7 shows an optical switch for narrow-band UV-A light, which is unpolarised. The incident light 8 passes through the dichroic UV glass 13 (narrow band), with an optically active layer being one-sided and on the inside.

The dichroic UV glass 14 has an optically active layer, which is aligned one-sided and on the inside. In the non-triggered state there is total extinction, while in the triggered state UV-A light 9 comes out, which is polarised in a linear manner. Transmission of the light in the triggered state is approx. 50%.

In FIG. 8 an optical switch for broad-band UV-A light is represented, which deviates in its structure in comparison with FIG. 6 in that the dichroic UV glass 13 has optically active layers on both sides, but with spectrally different absorption maximums (broadband enlargement). The dichroic UV glass 14 also has optically active layers on both sides with spectrally different absorption maximums. As in FIG. 6, extinction occurs place in the non-triggered state, while in the triggered state the incident UV-A light is polarised in a linear manner, with the transmission being approx. 50%.

What is claimed is:

1. Optical switch, consisting of two support plates made of glass, between which a liquid crystal substance is situated, said support plates being equipped with transparent electrodes, and at least one of the support plates consists of colour-structured dichroic glass, into which these dichroic filters are impressed, with said dichroic filters in form of colour and polarisation filter layers being situated inside a glass matrix, and the dichroic filters ranging from the support plate surface to a depth of about 10 $\mu$m.

2. Optical switch according to claim no. 1, characterised in that the support plates consist of plate glass.

3. Optical switch according to claim no. 1, characterised in that at least one support plate has dichroic filters impressed on both sides.

4. Optical switch according to claim no. 1, characterised in that in at least one support of colour-structured dichroic glass a monochrome filter layer is impressed.

5. Optical switch according to claim no. 1, characterised in that the filter layer of at least one support plate is arranged in such a way that it is in contact with the liquid crystal substance.

6. Optical switch according to claim no. 1, characterised in that the optical switch itself, as far as its number of polarisation filters is concerned, consists of not more than one polarisation filter.

* * * * *